United States Patent [19]
Wartenberg

[11] 3,844,758
[45] Oct. 29, 1974

[54] THERMAL TREATMENT OF GLASS

[76] Inventor: Erwin Wilhelm Wartenberg, Brunnenweisen 6, Riedenberg, Stuttgart, Germany

[22] Filed: Feb. 22, 1972

[21] Appl. No.: 228,105

[30] Foreign Application Priority Data
Mar. 1, 1971  Great Britain..................... 5703/71

[52] U.S. Cl..................................... 65/116, 65/104
[51] Int. Cl............................................ C03b 27/00
[58] Field of Search...................... 65/104, 114, 116

[56] References Cited
UNITED STATES PATENTS
3,725,024    4/1973    Sperry............................... 65/104 X FOREIGN PATENTS OR APPLICATIONS
229,574    2/1944    Switzerland........................... 65/116

OTHER PUBLICATIONS

Chemical Strengthening of Glass; by J. S. Olcott, pages 1,189–1,193, "Science," Vol. 140, 6-1-63.

Primary Examiner—Arthur D. Kellogg
Attorney, Agent, or Firm—Snyder, Brown and Ramik

[57] ABSTRACT

Glass is toughened by quenching the hot glass in a liquid selected from a family of chemically related liquids, e.g. silicone oils, whose viscosities at the quenching temperature form a series of ascending viscosity values corresponding to a series of descending values of central tensile stress to be induced in the glass.

The selected liquid has a viscosity which is effective to induce the required central tensile stress.

10 Claims, 2 Drawing Figures

THERMAL TREATMENT OF GLASS

BACKGROUND OF THE INVENTION

1. Field of the Invention

This invention relates to the thermal treatment of glass and more especially to the toughening of glass by quenching hot glass in a quenching liquid.

2. Description of the Prior Art

Thermally toughened glass can be produced by heating glass to a temperature near to its softening point and then quenching the glass in a liquid which is maintained at a temperature at about or below the boiling point of the liquid.

Mineral oils have been used with success as the quenching liquid for toughening glass and it has been proposed to select particular oils as being most effective for producing a desired degree of toughening in glass, particularly thin glass of thickness in the range 1 mm to 3 mm.

The toughening of sheets of flat glass which are 2 mm or 3 mm thick is of especial interest to users of those toughened sheets in the manufacture of laminated automobile windows and laminated window structures for aircraft. High strengths of glass have been produced in thin glass by the addition to a carrying liquid of high boiling point, e.g., a mineral oil of incipient boiling point of about 300°C, of a small amount of an additive liquid of much lower boiling point, for example a low boiling point organic liquid such as carbon tetrachloride or ethanol.

Highly toughened glass has been produced by liquid quenching methods and additionally there is increasing demand for dual fracture safety glass for use as windscreens in automobiles. There would be no propagated dicing fracture if such a windscreen is struck by a sharp object such as a stone hitting the outer face of the windscreen, but rather, a sharp object would only cause a cracking fracture in the windscreen. Upon impact of a blunt object having a high energy, for example the head of an occupant of an automobile the bending of the glass by that object augments the stress in the glass sufficiently to give a propagated shattering fracture producing particles which are so small that the windscreen disintegrates and severe injury to the occupant is avoided.

The degree of dicing of a toughened glass when it shatters, sometimes called the particle count, can be measured in terms of the number of particles per square centimetre. This particle count is controlled by the central tensile stress introduced in the glass by the toughening process.

It is a main object of the present invention to provide an improved method of toughening glass by quenching hot glass in a liquid in which more effective selection can be made of the central tensile stress induced in the glass thereby permitting a selection of a desired particle count.

A futher object of the invention is to provide an improved toughening method in which there is control of the central tensile stress induced in the glass for particular glass thickness to give accurate control of the dual fracture characteristics of the glass.

SUMMARY

The invention is based on the discovery that there are families of liquids which can be used for quenching hot glass, the members of each family, at a selected working temperature of the quenching liquid having increasing values of viscosity distributed over a defined viscosity range which have been found to correspond to a predetermined range of decreasing values of central tensile stress induced in the glass. The selected liquid has a viscosity which is effective to induce the required central tensile stress in the glass upon quenching the glass in the liquid at the selected quenching temperature.

The preferred family of liquids for carrying out the invention is a family of silicone oils of similar chemical structure.

This method is particularly applicable to liquids in which heat extraction from the glass surface takes place mainly by convection flow within the body of liquid in which the hot glass is quenched. The lower limit of the viscosity range of the silicone oils of each family is therefore the value of the viscosity of the first silicone oil of said family, considered in order of ascending viscosity value, in which effective heat extraction on quenching takes place mainly by convection flow within the oil.

It has been found that the silicone oils of each family at the low viscosity end of the viscosity range produce central tensile stress in the glass such that the glass shatters into particles by way of a propagated dicing fracture when the glass is fractured using a centre punch.

Silicone oils which lie within another selected part of the viscosity range produce glasses which have the dual fracture characteristic referred to above and for selection of that part of the viscosity range the lower limit of the viscosity range is the value of the viscosity of the first silicone oil of said family, considered in order of ascending viscosity value, which induces in the glass a central tensile stress insufficient to give dicing fracture upon impact by a sharp object. The upper limit of this selected part of the viscosity range is the value of the viscosity of the silicone oil of said family which induces in the glass a central tensile stress which is just sufficient to give dicing fracture when augmented by stress induced by impact by a soft body.

Beyond this upper limit of the selected part of the range there are higher viscosity silicone oils in each family which still induce a certain tensile stress in the glass which can usefully enhance the strength of the glass, although even when the central tensile stress is augmented by bending stress, dicing fracture does not usually result.

DESCRIPTION OF THE PREFERRED EMBODIMENTS

Figure 1:
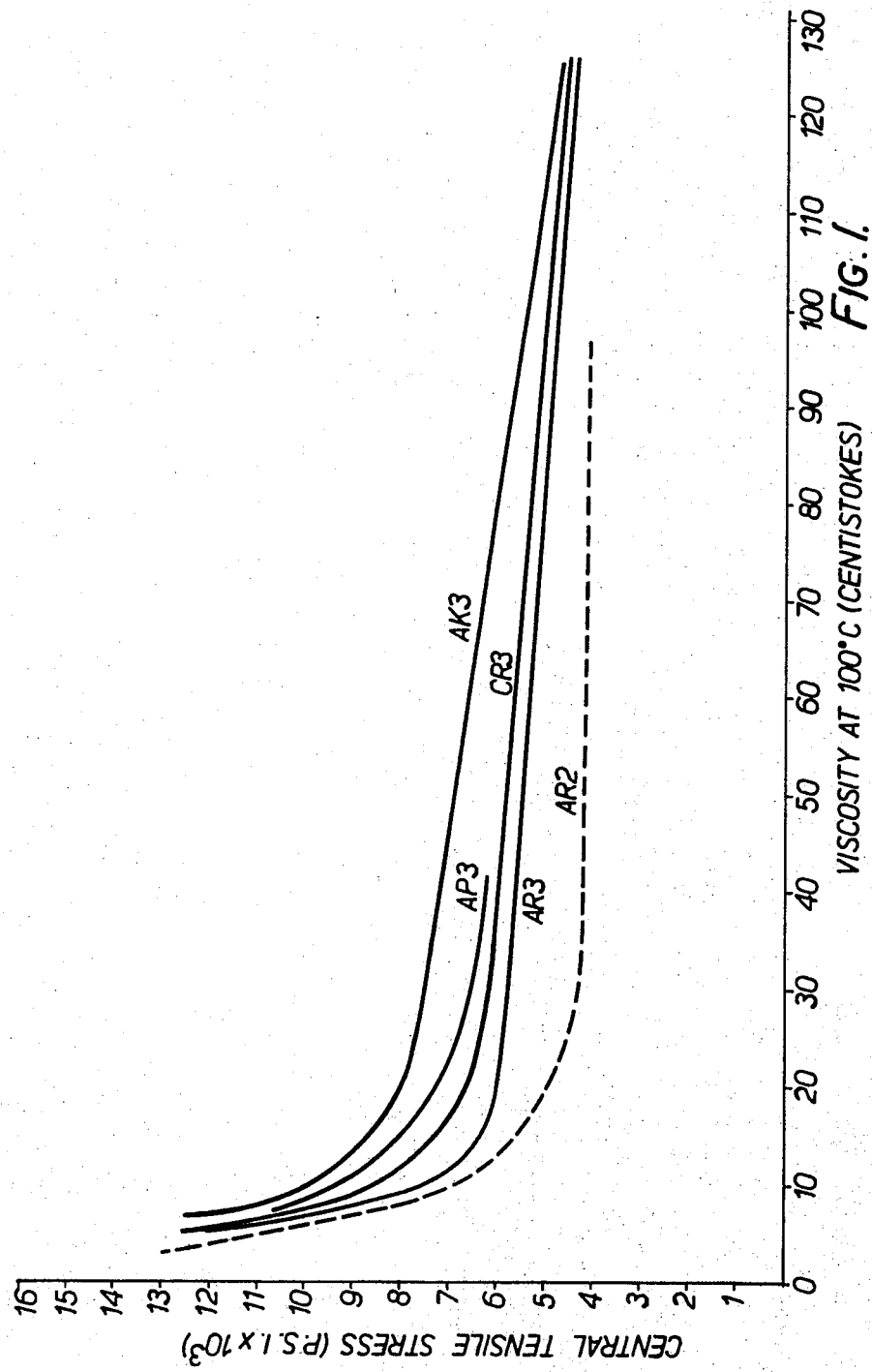
FIG. 1 is a graph of central tensile stress against viscosity at 100°C plotted to illustrate the relationship discovered to exist between the viscosity of liquids of a family of chemically related liquids at a given temperature, and the stress produced in glass upon toughening.

In all the examples, in order to provide readily comparable figures for each family of chemically related liquids which has been used, pieces of soda-lime-silica of the same size (120 mm by 20 mm) have been used throughout.

The same equipment has been used for the toughening of each piece of glass and first of all the glass was heated to a temperature of about 680° to 700°C in a furnace maintained at 800°C. The glass was held in the furnace for 2 minutes 15 seconds and then dropped under gravity from the furnace through a distance of about 20 centimetres into 500 cc of the quenching liquid which liquid was maintained at a constant working temperature of 100°C.

When the hot piece of glass enters the body of quenching liquid there is immediate rapid heating of the layer of liquid which is in contact with the glass surface as the glass travels downwardly endwise through the liquid. It is preferred in carrying out the invention that the chosen liquid should not undergo chemical change in the region of these layers of heated liquid which are in contact with the glass as it is quenched.

In order to provide viscosity-dependent control of the central tensile stress produced in the glass when it is toughened it has been found preferable to select the quenching liquid so that at the working temperature, e.g. 100°C, effective heat extraction from the glass surfaces takes place mainly by convection flow within the body of liquid.

Families of liquids which have been found to be particularly suitable for carrying out the invention are families of chemically related silicone oils. Within each family the molecular complexity reflects in the viscosity and the more complex the higher the viscosity. Within families of related silicone oils which are commercially available, are comprehended wider ranges of liquids whose viscosity considered at the working temperature, that is 100°C, extends from about $0.5 - 10^6$ centistokes.

In order to illustrate the invention, particular experiments using selected ranges of silicone oils will now be described. The silicone oils used were Wacker Silicone Oils manufactured by Wacker-Chemie GmbH of Munich, Germany.

One such family of oils is the Wacker Silicone Oil AK family which is a group of methylpolysiloxanes.

At the working temperature of 100°C each selected oil of the AK family has a clearly defined viscosity and using the AK oils it has been possible to select a series of oils whose viscosities at 100°C are distributed over a wide range of increasing viscosities, the actual viscosity of each liquid of the family at 100°C being somewhat lower than the viscosity of the next liquid of the family. In this way each family of liquids has an associated series of ascending values of viscosity. At a different working temperature, e.g., 150°C the viscosity range would be different.

The results of quenching a similar series of pieces of glass 3 mm thick in the manner described above are set out below in Table I.

TABLE I

Wacker Silicone Oil AK Series
3 mm glass

| Oil No. | Viscosity at 100°C (centistokes) | Central Tensile stress (p.s.i.) | Particle Count (/cm²) |
| --- | --- | --- | --- |
| 1 | 6.7 | 12,450 | 33 |
| 2 | 8 | 10,800 | 30 |

TABLE I-Continued

Wacker Silicone Oil AK Series
3 mm glass

| Oil No. | Viscosity at 100°C (centistokes) | Central Tensile stress (p.s.i.) | Particle Count (/cm²) |
| --- | --- | --- | --- |
| 3 | 10 | 9,900 | 26 |
| 4 | 12 | 9,400 | 22 |
| 5 | 15 | 8,500 | 20 |
| 6 | 17 | 8,400 | 13 |
| 7 | 20 | 7,900 | 6 |
| 8 | 21 | 7,800 | 4 |
| 9 | 34 | 7,700 | — |
| 10 | 90 | 5,720 | — |
| 11 | 120 | 4,600 | — |
| 12 | 350 | 4,000 | — |
| 13 | 4000 | 3,360 | — |

Each of the results given in this table represents average figures obtained by quenching a number of pieces of glass in the selected silicone oil. Each glass after quenching was allowed to cool in the oil to the oil temperature of 100°C. After removal from the oil and cooling to room temperature the toughened glass was cleaned and its central tensile stress was measured using a Babinet Compensator. Each glass was then hit with a centre punch and where dicing fracture occurred a particle count was made. The first oil of the AK series which was suitable is Oil No. 1 which is a commercially available silicone oil and this oil, whose viscosity was 6.7 centistokes at 100°C was found to be capable of producing toughened glass by effective heat extraction, mainly by convection flow within the oil giving a desired central tensile stress of 12,450 p.s.i. Upon fracture this resulted in a particle count of 33/cm² which particle count is governed by the central tensile stress in the glass.

The next commercially available oil in the AK series was Oil No. 6 which has a viscosity of 17 centistokes at 100°C. Glass quenched in this oil had a measured tensile stress of 8,400 p.s.i. and gave an average particle count of 13/cm².

Oils Nos. 2 to 5 of intermediate viscosity were obtained by proportional mixing of quantities of Oils Nos. 1 and 6 to give a desired viscosity at 100°C as recorded in Table I. This mixing was done in strict ratio to the viscosities of the two oils Nos. 1 and 6.

The figures of central tensile stress and particle count which were obtained established that for this first group of AK Silicone Oils Nos. 1 to 6 of the family the distribution of increasing viscosity over a range of 6.7 to 17 centistokes at 100°C corresponds to a distribution of decreasing values of central tensile stress from 12,450 to 8,400 p.s.i. and of particle count from 33/cm² to 13/cm². These results were plotted and FIG. 1 is the graph obtained of central tensile stress plotted against viscosity at 100°C. The graph of the results of Table I is denoted AK3 indicating results for 3 mm glass quenched in the AK family of silicone oils and in this limited range of viscosities from 6.7 to 17 centistokes there is a sharp fall in the central tensile stress produced according to a definite law represented by the curve AK3. In this region a small variation in viscosity produces a large difference in the central tensile stress produced.

The next available oil in the AK series was Oil No. 9 having a viscosity of 34 centistokes at 100°C and mixtures of Oils Nos. 6 and 9 were made to produce Oils Nos. 7 and 8 having intermediate viscosity values.

These mixed Oils Nos. 7 and 8 induced just sufficient central tensile stress in the glass to give a small particle count, respectively 6/cm² and 4/cm² upon fracture with a centre punch.

Quenching in Oil No. 9 produced glass which would not dice when hit with a centre punch so that apparently the central tensile stress measured at 7,700 p.s.i. was insufficient to give dicing fracture. However further experiments with Oils Nos. 10 to 13 which are all commercially available oils and whose viscosities extend over a wide range of increasing viscosity showed a progressive fall in the central tensile stress induced in the glass, although the curve of FIG. 1 flattens out. In one of these later experiments was the stress induced sufficient to give dicing fracture when the glass was hit with a centre punch. The central tensile stress induced by Oils 9 and 10, being greater than about 5,000 p.s.i. and in the region 5,000 to 7,000 p.s.i., would however be sufficient to give dicing fracture when augmented by stress induced upon bending of the glass by a high energy blunt object and glass toughened by Oils Nos. 9 and 10 exhibited the desirable dual fracture characteristic referred to above.

The high viscosity oils such as Oils Nos. 12 and 13 did not produce toughened glass with dicing fracture characteristics nevertheless produced glass with an increased strength since the modulus of rupture of glasses quenched in Oils Nos. 12 and 13 when measured by a four point bending test was found to be respectively 27,000 and 26,700 p.s.i. In all these experiments it was found that the decrease in central tensile stress was, as would be expected, accompanied by a decrease in modulus of rupture and in the experiments whose results are given in Table I the modulus of rupture decreased from about 49,000 p.s.i. for the glass quenched in Oil No. 1 to the just quoted figure of 26,700 p.s.i. for the glass quenched in Oil No. 13.

A similar series of experiments was carried out using Wacker Silicone Oils of the AR series. These are phenylmethylpolysiloxanes having 15 percent of phenyl groups and the result of the experiments in which pieces of glass 3 mm thick were quenched are set out in Table II as follows.

TABLE II

Wacker Silicone Oil AR series.
3 mm glass.

| Oil No. | Viscosity at 100°C (centistokes) | Central Tensile Stress (p.s.i.) | Particle Count (/cm²) |
|---|---|---|---|
| 1 | 5 | 12,000 | 54 |
| 2 | 12 | 6,400 | 4 |
| 3 | 21 | 6,000 | — |
| 4 | 34 | 5,700 | — |
| 5 | 52 | 5,600 | — |
| 6 | 77 | 4,900 | — |
| 7 | 150 | 4,600 | — |

These results are illustrated graphically in FIG. 1 by the curve AR3 which is of similar form of the curve AK3 but lies below that curve. This indicates that a slightly lesser degree of toughening was achieved but each selected AR silicone oil gave a definite degree of toughening represented by central tensile stress and particle count. The glasses produced by quenching in Oils Nos. 1 and 2 gave a definite particle count upon fracture and the glasses quenched in Oils Nos. 3, 4 and 5 exhibited dual fracture characteristics. By proportional mixing of oils Nos. 1 and 2 both of which are commercially available oils, glasses of different degrees of toughening could be achieved at the low viscosity end of the family which gives a particle count when struck with a centre punch.

It was found that the first oil of the AR series which could be employed had a slightly lower viscosity at 100°C, namely 5 centistokes, than the first oil of the AK series. There was a higher particle count achieved although the central tensile stress value as measured was one of the same order as that achieved with the AK Oil No. 1 and this variation in the results may have been caused by some other factor present during the particular experiments.

Figure 2:
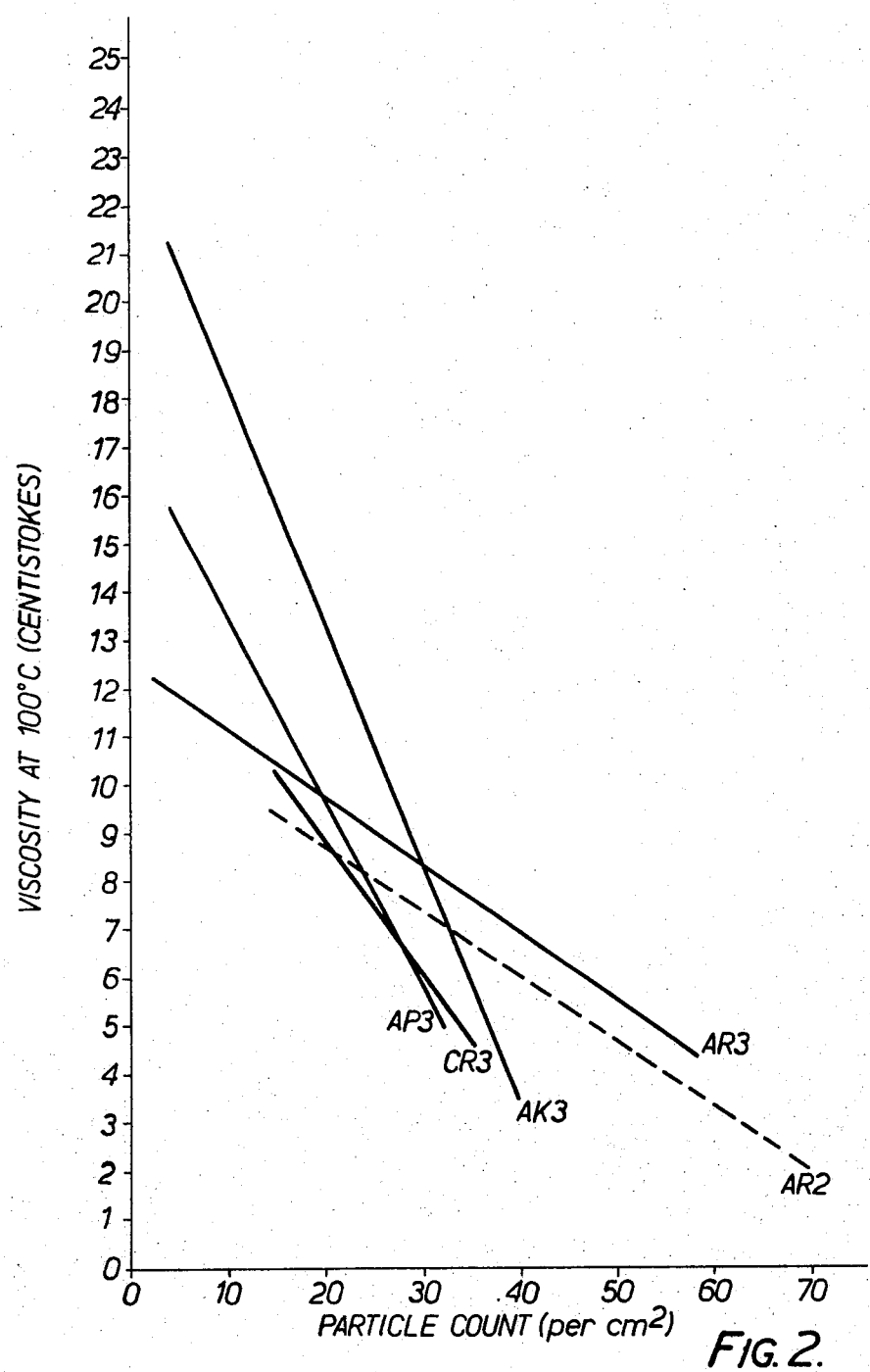
FIG. 2 is a graph of particle count plotted against viscosity illustrating a relationship existing between dicing characteristics when fractured with a centre punch and the viscosity of the liquid in which the glass is quenched.

FIG. 2 is a plot of viscosity at 100°C of the quenching liquid against particle count and for those glasses in which there was a dicing fracture when hit with a centre punch the relationship appears to take a straight line form as shown, there being a definite tendency for the particle count to increase as the viscosity decreases and selection of a desired particle count can be achieved by selecting the appropriate oil of the family of desired viscosity and then using that oil for quenching. The relationship between viscosity and particle count as indicated by the region of the graph occupied by all the lines plotted although the disparity of the line AR3 may be due to some disparity in the results recorded for quenching oil No. 1 in Table II.

Table III represents results achieved by quenching with the CR series of Wacker Silicone Oils which are also phenylmethylpolysiloxanes, as follows:

TABLE III

Wacker Silicone Oil CR Series.
3 mm glass.

| Oil No. | Viscosity at 100°C (centistokes) | Central Tensile Stress (p.s.i.) | Particle Count (/cm²) |
|---|---|---|---|
| 1 | 5 | 12,500 | 34 |
| 2 | 10 | 8,450 | 16 |
| 3 | 17 | 7,000 | — |
| 4 | 27 | 6,300 | — |
| 5 | 36 | 6,100 | — |
| 6 | 45 | 5,800 | — |
| 7 | 80 | 5,300 | — |

The same tendencies in the results were shown as illustrated in FIGS. 1 and 2.

Results of a further series of experiments using the Wacker Silicone Oils of the AP series are shown in Table IV as follows:

TABLE IV

Wacker Silicone Oil AP Series.
3 mm glass.

| Oil No. | Viscosity at 100°C (centistokes) | Central Tensile Stress (p.s.i.) | Particle Count (/cm²) |
|---|---|---|---|
| 1 | 5.8 | 10,600 | 30 |
| 2 | 12 | 8,600 | 14 |
| 3 | 15 | 7,900 | 6 |
| 4 | 40 | 6,200 | — |

The siloxanes of this AP series have 35 percent phenyl groups.

As well as toughening pieces of glass 3 mm thick similar pieces of glass 2 mm thick were quenched using the AR series of oils as shown in Table V below.

TABLE V

Wacker Silicone Oils AR Series.
2 mm glass.

| Oil No. | Viscosity at 100°C Count (centistokes) | Central Tensile Stress (p.s.i.) | Particle Count (/cm²) |
|---|---|---|---|
| 0 | 3 | 13,000 | 69 |
| 1 | 5 | 11,150 | 35 |
| 1.5 | 10 | 8,500 | 17 |
| 2 | 12 | 6,300 | — |
| 3 | 21 | 4,700 | — |
| 4 | 34 | 5,000 | — |
| 5 | 52 | 4,150 | — |
| 6 | 77 | 4,100 | — |
| 7 | 150 | 4,150 | — |

A higher particle count could be achieved using a low viscosity oil and in these experiments the first oil was an oil (Oil No. 0) having a viscosity of 3 centistokes at 100°C. Oil No. 1.5 was produced by mixing proportions of the Oils Nos. 1 and 2 whose viscosities were 5 and 12 at 100°C.

For 2 mm glass the results also showed the same trend and there is an apparent parallel between the lines AR2 and AR3 in FIG. 2. Also a clear relationship exists between the curves AR2 and AR3 in FIG. 1.

Using each family of silicone oils glasses could be produced which had either a dicing fracture characteristic when struck with a centre punch or which exhibited dual fracture characteristics. In the pieces of glass which were used in the experiments the dual fracture characteristics normally existed towards the upper end of the 5,000 to 7,000 p.s.i. region of central tensile stress but in larger pieces of glass these characteristics were clearly shown in glass whose central tensile stress was at the 5,000 p.s.i. end of this region.

The invention thus provides a new method of toughening glass by quenching in a liquid which provides the possibility for accurate selection of a liquid at a working temperature of the liquid which is related to the temperature of the glass. The liquid is selected in terms of its viscosity to give a desired central tensile stress and thereby desired fracture characteristics of the glass upon toughening of the glass. By selection and regulation of the liquid viscosity at a particular working temperature the process can be regulated to produce a consistent degree of toughening in a series of pieces of glasses being quenched.

The method of the invention may be used for the toughening of flat or bent sheets of glass or for the toughening of glass articles for example hollow glass articles such as glass containers and bottles, glass tableware, insulators and hollow glass blocks.

The invention may also be used for the toughening of small glass articles, for example lenses and gauge glasses.

I claim:

1. A method of thermally treating glass to produce a selected central tensile stress therein which central tensile stress is within a predetermined range at whose upper limit the glass will exhibit dicing fracture when struck with a sharp object and at whose lower limit the glass will exhibit (1) cracking fracture when struck with a sharp object and (2) dicing fracture upon bending of the glass for example when struck with a blunt object such as a human head, comprising:
   a. constituting a body of quenching liquid of a selected family of silicone oils of similar chemical structure the viscosities of whose members at 100°C are distributed over a defined viscosity range the lower end of which defined range is between about 3 centistokes and about 350 centistokes and corresponds to said predetermined range of central tensile stress to be induced in the glass;
   b. maintaining the body of quenching liquid at a selected quenching temperature which is not less than about 100°C and is effective to provide heat extraction from the glass surfaces mainly by convection flow within said liquid;
   c. heating the glass to a temperature near to its softening point;
   d. quenching the hot glass in said body of quenching liquid by immersion therein to cool to said selected quenching temperature by heat extraction from the glass surfaces mainly by convection flow within said liquid; and
   e. controlling the viscosity of said quenching liquid at said selected quenching temperature by selection of at least one member of said family of silicone oils to produce said predetermined central tensile stress in the treated glass.

2. A method of thermally treating glass of thickness in the range 1 mm to 3 mm to possess a predetermined central tensile stress which central tensile stress is within a predetermined range at whose upper limit the glass will exhibit dicing fracture when struck with a sharp object and at whose lower limit the glass will exhibit (1) cracking fracture when struck with a sharp object and (2) dicing fracture upon bending of the glass for example when struck with a blunt object such as a human head, comprising:
   a. constituting a body of quenching liquid of at least one selected member of a family of silicone oils of similar chemical structure the viscosities of whose members at 100°C are distributed over the range 3 to 4,000 centistokes the lower end of which range below about 350 centistokes corresponds to said predetermined range of central tensile stress to be induced in the glass, the body of quenching liquid having a viscosity at 100°C which is within said lower end of said range so as to be effective to induce said predetermined central tensile stress in the glass upon quenching the glass in the oil,
   b. maintaining said body of quenching liquid at a selected quenching temperature which is not less than about 100°C and is effective to provide heat extraction from the glass surfaces mainly by convection flow within said liquid;
   c. heating the glass to a temperature near to its softening point; and
   d. quenching the hot glass in said body of quenching liquid by immersion therein to cool to said selected quenching temperature by heat extraction from the glass surfaces mainly by convection flow within said liquid thereby to produce said predetermined central tensile stress in the glass.

3. A method of toughening glass to possess a predetermined central tensile stress which central tensile stress is within a predetermined range at whose upper limit the glass will exhibit dicing fracture when struck with a sharp object and at whose lower limit the glass will exhibit (1) cracking fracture when struck with a sharp object and (2) dicing fracture upon bending of the glass for example when struck with a blunt object such as a human head, comprising: a. constituting a body of quenching liquid of at least one selected member of a family of methylpolysiloxanes the viscosities of whose members at 100°C are distributed over the range 6.7 to 4,000 centistokes and the lower end of which range below about 120 centistokes corresponds to said predetermined range of central tensile stress to be induced in the glass, the quenching liquid having a viscosity at 100°C within said lower end of said viscosity range so as to be effective to induce said predetermined central tensile stress in the glass, b. maintaining said body of quenching liquid at a selected quenching temperature which is not less than about 100°C and is effective to provide heat extraction from the glass surfaces mainly by convection flow within said liquid, c. heating the glass to a temperature near to its softening point, and d. quenching the hot glass in said quenching liquid body by immersion therein to cool to said selected quenching temperature by heat extraction from the glass surfaces mainly by convection flow within said liquid thereby to induce said predetermined central tensile stress in the glass.

4. A method of toughening glass of thickness in the range of $q$ mm to 3 mm to possess a predetermined central tensile stress which central tensile stress is within a predetermined range at whose upper limit the glass will exhibit dicing fracture when struck with a sharp object and at whose lower limit the glass will exhibit (1) cracking fracture when struck with a sharp object and (2) dicing fracture upon bending of the glass for example when struck with a blunt object such as a human head, comprising: a. constituting a body of quenching liquid of at least one selected member of a family of phenylmethylpolysiloxanes having 15 percent phenyl groups the viscosities of whose members at 100°C are distributed over the range 3 to 150 centistokes and the lower end of which range below about 52 centistokes corresponds to said predetermined range of central tensile stress to be induced in the glass, the quenching liquid having a viscosity at 100°C within said lower end of said viscosity range so as to be effective to induce said predetermined central tensile stress in the glass, b. maintaining said body of quenching liquid at a selected quenching temperature which is not less than about 100°C and is effective to provide heat extraction from the glass surfaces mainly by convection flow within said liquid, c. heating the glass to a temperature near to its softening point, and d. quenching the hot glass in said quenching liquid body by immersion therein to cool to said selected quenching temperature by heat extraction from the glass surfaces mainly by convection flow within said liquid thereby to induce said predetermined central tensile stress in the glass.

5. A method of toughening glass of 3 mm thickness to possess a predetermined central tensile stress which central tensile stress is within a predetermined range at whose upper limit the glass will exhibit dicing fracture when struck with a sharp object and at whose lower limit the glass will exhibit (1) cracking fracture when struck with a sharp object and (2) dicing fracture upon bending of the glass for example when struck with a blunt object such as a human head, comprising:

a. constituting a body of quenching liquid of at least one selected member of a family of phenylmethylpolysiloxanes having 35 percent phenyl groups, the viscosities of whose members at 100°C are in the range 5 to 40 centistokes and which range of viscosities corresponds to said predetermined range of central tensile stress to be induced in the glass, b. maintaining said body of quenching liquid at a selected quenching temperature which is not less than about 100°C and is effective to provide heat extraction from the glass surfaces mainly by convection flow within said liquid, c. heating the glass to a temperature near to its softening point, and d. quenching the hot glass in said quenching liquid body by immersion therein to cool to said selected quenching temperature by heat extraction from the glass surfaces mainly by convection flow within said liquid thereby to induce said predetermined central tensile stress in the glass.

6. A method according to claim 1 comprising constituting said body by mixing two members of the family which are respectively of higher and lower viscosity than the desired viscosity of the selected silicone oil, which two members are mixed in proportions to produce the selected silicone oil of desired viscosity.

7. A method according to claim 2, comprising constituting said body by mixing two members of the family which are respectively of higher and lower viscosity than the viscosity required for the quenching liquid.

8. A method according to claim 3, comprising constituting said body by mixing two members of the family which are respectively of higher and lower viscosity than the viscosity required for the quenching liquid.

9. A method according to claim 4, comprising constituting said body by mixing two members of the family which are respectively of higher and lower viscosity than the viscosity required for the quenching liquid.

10. A method according to claim 5, comprising constituting said body by mixing two members of the family which are respectively of higher and lower viscosity than the viscosity required for the quenching liquid.

* * * * *